US006813538B2

(12) United States Patent
Higuchi et al.

(10) Patent No.: US 6,813,538 B2
(45) Date of Patent: Nov. 2, 2004

(54) WELDING SYSTEM

(75) Inventors: Daisuke Higuchi, Ayase (JP); Yasuhiro Obara, Ayase (JP); Yoshihiro Sato, Ayase (JP)

(73) Assignee: Obara Corporation, Kanagawa-ken (JP)

( * ) Notice: Subject to any disclaimer, the term of this patent is extended or adjusted under 35 U.S.C. 154(b) by 0 days.

(21) Appl. No.: 10/128,124

(22) Filed: Apr. 23, 2002

(65) Prior Publication Data

US 2002/0161473 A1 Oct. 31, 2002

(30) Foreign Application Priority Data

Apr. 25, 2001 (JP) ........................................ 2001-126940

(51) Int. Cl.[7] ............................................. G06F 19/00
(52) U.S. Cl. .................... 700/207; 700/213; 219/110
(58) Field of Search ............................. 219/110; 700/11, 700/207, 213, 249, 20, 63, 212, 247, 2, 3, 5, 7, 245; 901/42; 174/682; 710/11; 361/826

(56) References Cited

U.S. PATENT DOCUMENTS

| | | | | |
|---|---|---|---|---|
| 4,945,201 A | | 7/1990 | Ito et al. | |
| 5,225,974 A | * | 7/1993 | Mathews et al. | 700/11 |
| 5,321,225 A | | 6/1994 | Boyer | |
| 5,683,598 A | | 11/1997 | Moro | |
| 5,978,578 A | * | 11/1999 | Azarya et al. | 717/100 |
| 5,978,593 A | * | 11/1999 | Sexton | 710/1 |
| 6,004,019 A | * | 12/1999 | Suita et al. | 700/212 |
| 6,032,203 A | * | 2/2000 | Heidhues | 710/11 |
| 6,151,640 A | * | 11/2000 | Buda et al. | 710/11 |
| 6,275,741 B1 | * | 8/2001 | Choi | 700/200 |
| 6,315,186 B1 | * | 11/2001 | Friedl et al. | 228/102 |
| 6,609,033 B1 | * | 8/2003 | Kawai | 700/5 |
| 2002/0048161 A1 | * | 4/2002 | Malkowski et al. | 361/826 |
| 2002/0077721 A1 | * | 6/2002 | Linn et al. | 700/193 |
| 2002/0119706 A1 | * | 8/2002 | Sagues et al. | 439/638 |

FOREIGN PATENT DOCUMENTS

EP 0911 107 4/1999

OTHER PUBLICATIONS

"The basics of fieldbus", 1998,Rosemount Inc.*
"Open Control Systems and DeviceNet Applications", 1999, Yoshihiro Miyazaki and Hiroaki Fukumaru,Hitachi Review vol. 48 No. 1–No. 6.*
"Wave 1 Networking Standards: Features and Functionality",2001, Jim Wells and Jim Heaton.*

* cited by examiner

Primary Examiner—Albert W. Paladini
Assistant Examiner—Carlos R. Ortiz
(74) Attorney, Agent, or Firm—Flynn, Thiel, Boutell & Tanis P.C.

(57) ABSTRACT

A welding system is capable of shortening length of connection lines and of effectively utilizing devices as a whole. The system includes a welding controller provided with an I/O interface, a controller unit provided with a programmable logic controller and connected to the I/O interface of the welding controller through a field bus interface serving as a communication link, a welding machine and general-purpose peripheral equipment. The welding controller controls the welding machine and the general-purpose peripheral equipment upon receipt of instructions from the programmable logic controller through the field bus interface.

13 Claims, 1 Drawing Sheet

WELDING SYSTEM

FIELD OF THE INVENTION

The invention relates to a welding system comprising a welding controller operable in response to instructions from a controller provided with a PLC (Programmable Logic Controller) and the like via a network.

BACKGROUND OF THE INVENTION

Conventionally, in a case where a field bus serving as communication means, such as a device net, for outputting control instructions from a controller to a welding controller provided with a PLC and welding related general-purpose peripheral equipment is not used, a welding machine and the general-purpose peripheral equipment are controlled by disposing multiple wirings, namely, by effecting multiple wiring connections between the controller provided with the PLC and the like and the welding controller and the general-purpose peripheral equipment. In such a case, since multiple wiring connections are needed for the control instructions, it is very complex in information or instruction transmission and in the formation of instruction means.

Accordingly, it is considered to use well known field bus serving as communication means for transmitting instructions from a controller provided with a PLC and the like to a welding controller and the general-purpose peripheral equipment (general-purpose I/O equipment) as shown in FIG. 2. That is, a control communication is effected by a field bus 36 between a PLC 32 provided in a robot/welding control board 31 and a welding controller 34 and a general-purpose I/O slave 35 of the general-purpose peripheral equipment via a branch tap 33.

Meanwhile, even if the field bus communication means as exemplified by the conventional well known device net as shown in FIG. 2 and the like has been used, there arise problems that the length of each connection lines becomes long and the branch tap 33 has to be used, thereby requiring separately the installation of the general-purpose I/O slave 35, resulting in non-effective utilization of the devices as a whole because the length between the PLC 32 and the welding controller 34 and also the length between the PLC 32 and the general-purpose I/O slave 35 are respectively spaced apart from one another in a long distance.

SUMMARY OF THE INVENTION

The invention has been developed in view of the foregoing problems of the prior art, and it is an object of the invention to provide a welding system comprising a welding controller capable of controlling a welding machine and a general-purpose peripheral equipment upon receipt of instructions from a PLC provided in a controller, thereby shortening the length of each connection line and of effectively utilizing devices as a whole by adding a network function for a general-purpose peripheral equipment to a welding controller.

To achieve the above objects, the welding system of the invention is characterized in comprising a welding controller provided with an I/O interface, a controller provided with a programmable logic controller and connected to the I/O interface of the welding controller through a field bus interface serving as communication means, a welding machine connected to the I/O interface of the welding controller through connection lines serving as a network, and a general-purpose peripheral equipment connected to the I/O interface of the welding controller through connection lines serving as another network, wherein the welding controller controls the welding machine and the general-purpose peripheral equipment upon receipt of instructions from the programmable logic controller through the field bus interface.

The invention is further characterized in that the I/O interface of the welding controller bundles the network of the welding machine and another network of the general-purpose equipment.

The invention is further characterized in that the I/O interface has I/O terminals a part of which is connected to the welding machine and another part of which is connected to an I/O circuit of the general-purpose peripheral equipment.

PREFERRED EMBODIMENT OF THE INVENTION

Figure 1:
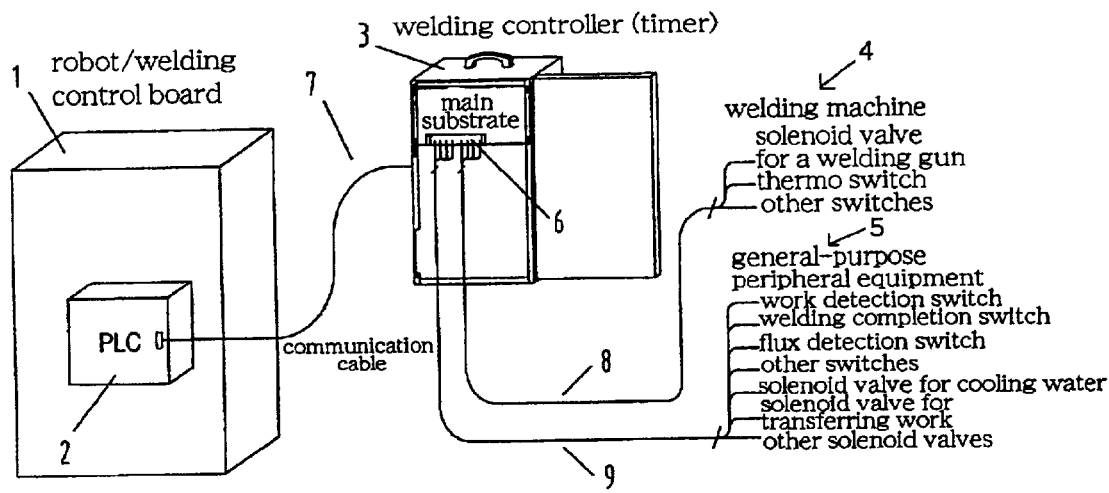
FIG. 1 is a schematic view showing the construction of an FA (Factory Automation) system suitable for working a welding controller of the invention.
Figure 2:
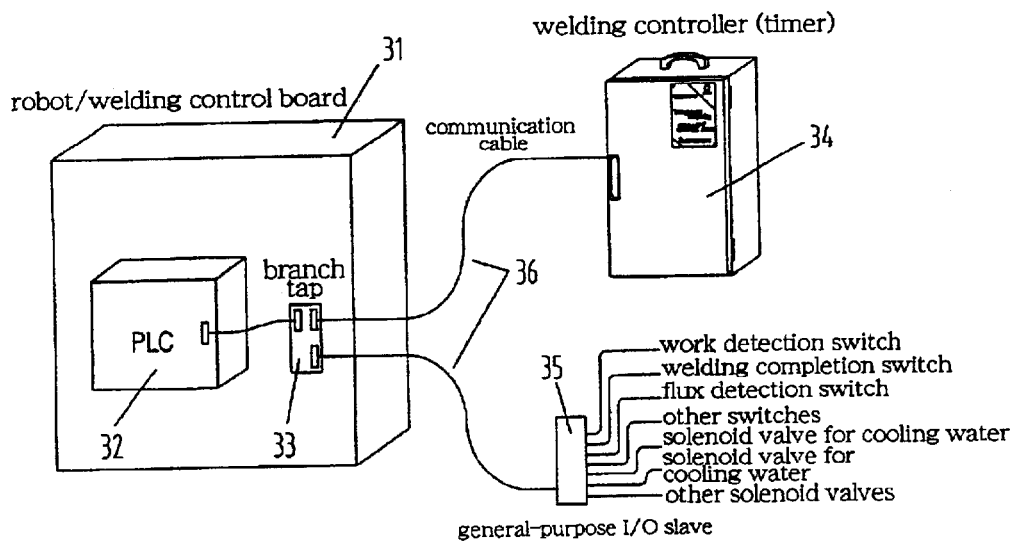
FIG. 2 is a schematic view showing the construction of an FA system suitable for working a conventional welding controller.

A welding controller according to a preferred embodiment of the invention is now described with reference to the attached drawings. FIG. 1 is a schematic view showing the construction of an FA system suitable for working a welding controller of the invention.

In FIG. 1, depicted by 1 is a robot/welding control board, and a PLC 2 is disposed in the robot/welding control board 1. 3 is a timer serving as a welding controller, 4 is a welding machine to be controlled by the welding controller 3, 5 is a general-purpose peripheral equipment which is positioned in the periphery of the welding machine 4 and correctively represents a peripheral equipment such as a solenoid valve for controlling cooling water, a flux detection switch, a solenoid valve for transferring a work, a work detection information input switch and the like.

An interface of communication means of a field bus (such as device net) 7 is used between the PLC 2 and an I/O interface (terminal block) 6 of the welding controller 3 so that the welding machine 4 is controlled by the PLC 2 via a network or multiple connection lines 8 between the welding controller 3 and the welding machine.

Each element of the general-purpose peripheral equipment 5 is connected to the I/O interface 6 inside the welding controller 3 via another network or multiple connection lines 9 instead of the conventional general-purpose I/O slave 35 so that the I/O interface 6 inside the welding controller 3 is connected to the general-purpose peripheral equipment 5 without providing the general-purpose I/O slave 35, and it is substituted for the general-purpose I/O slave 35.

Terminals of the I/O interface 6 needed by the welding controller 3 for sending and receiving a welding start signal are needed when the welding controller 3 is operated by use of the interface serving as communication means such as a device net, however, they are dispensed when the device net is not used. When the connection lines 9 for controlling the general-purpose peripheral equipment 5 provided relatively close to the welding controller 3 are connected to the I/O interface 6 using a space where the terminals for sending and receiving the welding start signal are dispensed with so that the I/O interface 6 inside the welding controller 3 is substituted for the general-purpose I/O slave of the general-purpose peripheral equipment 5, and hence a network function of the general-purpose peripheral equipment 5 is applied to the welding controller 3.

Since the control of the general-purpose peripheral equipment 5 by the communication means can be effected between the PLC 2 and the welding controller 3 which is provided adjacent to and connected to the general-purpose peripheral equipment 5 without connecting between the PLC 2 and the general-purpose peripheral equipment 5, the function of network for the general-purpose peripheral equipment 5 is added to the welding controller 3, so that the welding machine 4 and the general-purpose peripheral equipment 5 are controlled by the controller provided with the PLC 2, thereby shortening the length of the connection lines and omitting the control power source to be used by the general-purpose peripheral equipment 5, and also effectively utilizing the devices as a whole.

The network 8 for controlling the welding machine 4 inside the welding controller 3 and the network 9 for controlling the general-purpose peripheral equipment 5 are bundled by the I/O interface 6, thereby controlling both the welding machine 4 and general-purpose peripheral equipment 5. As a result, the I/O interface 6 inside the welding controller 3 is substituted for the general-purpose I/O slave of the general-purpose peripheral equipment 5 so that the welding machine 4 and the general-purpose peripheral equipment 5 are controlled by the controller provided with the PLC 2, thereby shortening the length of the connection lines and also effectively utilizing the devices as a whole.

Further, when a part of the I/O interface 6 inside the welding controller 3 where the welding start signal, the terminals for sending and receiving the welding start signal are dispensed with is rendered in a state to be connected with an I/O circuit of the network for the general-purpose peripheral equipment 5, so that the function of the welding controller 3 is more generalized.

Although the foregoing preferred embodiment is explained as a case where the welding controller 3 employed an interface of device net applied to the communication means from the PLC 2, it is possible to apply the interface of the device net to communication means from every computer including a personal computer and the like as well as the PLC. It is also possible to employ other field networks for the field bus as well as the device net.

According to the invention, the field bus interface such as device net is applied to the communication means from the PLC and the like, so that the welding controller has a function for controlling the welding machine and the general-purpose peripheral equipment. As a result, the function of the network for the general-purpose peripheral equipment is added to the welding controller so that the welding machine and the general-purpose peripheral equipment are controlled by the controller provided with the PLC, thereby shortening the length of the connection lines, omitting the control power source to be used by the general-purpose peripheral equipment, and also effectively utilizing the devices as a whole.

Further, since the interface of the network for controlling the welding machine inside the welding controller and the interface of the network for controlling the general-purpose peripheral equipment are bundled by the I/O interface of the welding controller, thereby controlling both the welding machine and general-purpose peripheral equipment, the I/O interface inside the welding controller is substituted for the general-purpose I/O slave of the general-purpose peripheral equipment so that the welding machine and the general-purpose peripheral equipment are controlled by the controller provided with the PLC, thereby shortening the length of the connection lines and also effectively utilizing the devices as a whole.

Still further, when the welding controller is connected to the network, a part of the welding controller at the I/O terminals of the I/O interface can be connected to the I/O circuit of the general-purpose peripheral equipment, thereby rendering the controller to be widely generalized.

What is claimed is:

1. A welding system comprising a welding controller provided with an I/O interface, a controller unit provided with a programmable logic controller and connected to the I/O interface of the welding controller through a dedicated field bus interface serving as communication means, a welding machine connected to the I/O interface of the welding controller through first connection lines serving as a first network, and general-purpose peripheral equipment connected to the I/O interface of the welding controller through second connection lines serving as a second network, wherein the welding controller controls the welding machine in response to the general-purpose peripheral equipment and instructions received from the programmable logic controller through the dedicated field bus interface, and wherein the I/O interface includes I/O terminals, a part of which is directly connected to the welding machine and another part of which is connected to the general-purpose peripheral equipment, so that the welding controller bundles the first network of the welding machine and the second network of the general-purpose peripheral equipment, and said welding controller is only connected to the welding machine, the general-purpose peripheral equipment and the programmable logic controller.

2. A welding system comprising:

a robot/welding control board including a programmable logic controller;

a welding controller including therein an input/output interface;

a dedicated field bus having a plurality of signal connector lines connecting the control board to the welding controller;

a welding machine;

a first multiple connection line connecting the input/output interface of said welding controller to said welding machine;

general-purpose peripheral equipment; and a second separate multiple connection line connecting the input/output interface of said welding controller to said general-purpose peripheral equipment;

wherein said welding controller controls said welding machine and said general-purpose peripheral equipment in response to signals received from said programmable logic controller through said dedicated field bus, wherein the connections to said welding controller consist of said field bus and said first and second multiple connection lines;

wherein having said general-purpose peripheral equipment connected to said welding controller by the second multiple connection line shortens the length of the connection from the control board to the general-purpose equipment, wherein the welding controller provides power to said general-purpose peripheral equipment by the second multiple connection line so that said general-purpose peripheral equipment is free from a power line separate from the second multiple connection line, and wherein said welding controller is only connected to said welding machine, said general-purpose peripheral equipment and said programmable logic controller of said control board.

3. The welding system of claim 2, wherein said input/output interface of said welding controller includes input/output terminals, part of said input/output terminals being connected by said first multiple connection line to said welding machine, and part of said input/output terminals being connected by said second multiple connection line to said general-purpose peripheral equipment.

4. The welding system of claim 2, wherein said input/output interface comprises a terminal block.

5. The welding system of claim 2, said welding machine including a solenoid valve for a welding gun and a thermo switch connected to said welding controller by said first multiple connection line.

6. The welding system of claim 5, said general-purpose peripheral equipment including a work detection switch, a welding detection switch, a welding completion switch, a flux detection switch, a solenoid valve for cooling water and a solenoid valve for transferring work connected to said welding controller by said second multiple connection line.

7. The welding system of claim 2, said general-purpose peripheral equipment comprising a work detection switch and a welding detection switch connected to said welding controller by said second multiple connection line.

8. The welding system of claim 7, said general-purpose peripheral equipment comprising a welding completion switch and a flux detection switch connected to said welding controller by said second multiple connection line.

9. The welding system of claim 8, said general-purpose peripheral equipment comprising a solenoid valve for cooling water and a solenoid valve for transferring work connected to said welding controller by said second multiple connection line, said second multiple connection line providing a different wire connection for each of the peripheral equipment.

10. A welding system comprising:

a robot/welding control board including a programmable logic controller;

a welding controller including therein an input/output interface, said input/output interface comprising a terminal block;

a dedicated field bus having a plurality of connecting signal lines connecting the welding controller to said programmable logic controller of said control board;

a welding machine, said welding machine including a solenoid valve for a welding gun and a thermo switch;

a first plurality of signal connection lines connecting said welding machine including said welding gun and said thermo switch to said terminal block of said welding controller;

general-purpose peripheral equipment, said general-purpose peripheral equipment comprising a work detection switch, a welding detection switch, a welding completion switch and a flux detection switch; and a second plurality of signal connection lines for connecting each said switch of said general-purpose peripheral equipment to said terminal block of said welding controller, wherein said welding controller controls said welding machine in response to said general-purpose peripheral equipment and signals received from said programmable logic controller through said dedicated field bus, wherein said welding controller is only connected to said welding machine, said general-purpose peripheral equipment and said programmable logic controller of said control board, and wherein having said general-purpose peripheral equipment connected to said welding controller shortens the length of the second plurality of signal connection lines.

11. The welding system of claim 10, wherein said second plurality of connection lines includes a wire that provides power to said general-purpose peripheral equipment so that said general-purpose peripheral equipment is free from a power line separate from the second plurality of connection lines.

12. The welding system of claim 10, wherein each said switch of said general-purpose peripheral equipment is connected to said terminal block of said welding controller by a separate wire of said second plurality of signal connection lines.

13. The welding system of claim 12, said general-purpose peripheral equipment comprising a solenoid valve for cooling water and a solenoid valve for transferring work, each said valve connected by one of said second plurality of signal connection lines to said terminal block of said welding controller.

* * * * *